United States Patent
Baidas et al.

(10) Patent No.: US 11,126,218 B2
(45) Date of Patent: Sep. 21, 2021

(54) FAST PROTECTION SWITCHING IN DISTRIBUTED SYSTEMS

(71) Applicant: Integrated Device Technology, Inc., San Jose, CA (US)

(72) Inventors: Zaher Baidas, Kanata (CA); Ernst JG den Broeder, Stittsville (CA); Leonid Goldin, Ottawa (CA)

(73) Assignee: Integrated Device Technology, Inc., San Jose, CA (US)

( * ) Notice: Subject to any disclaimer, the term of this patent is extended or adjusted under 35 U.S.C. 154(b) by 109 days.

(21) Appl. No.: 16/520,635

(22) Filed: Jul. 24, 2019

(65) Prior Publication Data

US 2020/0033910 A1    Jan. 30, 2020

Related U.S. Application Data

(60) Provisional application No. 62/703,300, filed on Jul. 25, 2018.

(51) Int. Cl.
| | | |
|---|---|---|
| *G06F 1/12* | (2006.01) | |
| *G06F 1/10* | (2006.01) | |
| *G06F 13/42* | (2006.01) | |
| *H04B 14/02* | (2006.01) | |
| *G06F 1/14* | (2006.01) | |

(52) U.S. Cl.
CPC .................. *G06F 1/12* (2013.01); *G06F 1/10* (2013.01); *G06F 1/14* (2013.01); *G06F 13/4221* (2013.01); *G06F 13/4291* (2013.01); *H04B 14/026* (2013.01)

(58) Field of Classification Search
CPC ..... G06F 1/10; G06F 1/12; G06F 1/14; G06F 13/4221; G06F 13/4291; H04B 14/026
See application file for complete search history.

(56) References Cited

U.S. PATENT DOCUMENTS

| | | | | |
|---|---|---|---|---|
| 9,479,182 | B1 * | 10/2016 | Baidas | H04L 7/00 |
| 9,628,255 | B1 * | 4/2017 | Baidas | H04L 7/0008 |
| 9,710,423 | B2 * | 7/2017 | Sengoku | G06F 13/4291 |
| 9,852,039 | B1 * | 12/2017 | Goldin | G06F 11/2205 |
| 10,075,284 | B1 * | 9/2018 | Rodrigues | H04L 49/30 |
| 2020/0033909 | A1 * | 1/2020 | Rupert | G06F 1/12 |

* cited by examiner

*Primary Examiner* — Brian T Misiura
(74) *Attorney, Agent, or Firm* — Haynes and Boone, LLP

(57) ABSTRACT

A system that switches between a clock signal from a first line card and a clock signal from a second line card based on information transmitted from the first line card and the second line card on timing signals is presented. Some methods include receiving a first pulse-width modulated clock signal from a first line card, the first pulse-width modulated clock signal including information regarding the status of the first line card; receiving a second pulse-width modulated clock signal from a second line card, the second pulse-width modulated clock signal including information regarding the status of the second line card; producing a clock signal from the first pulse-width modulated clock signal; and switching to producing the clock signal from the second pulse-width modulated clock signal based on the information in the first pulse-width modulated clock signal.

6 Claims, 2 Drawing Sheets

FAST PROTECTION SWITCHING IN DISTRIBUTED SYSTEMS

RELATED APPLICATIONS

This disclosure claims priority to U.S. Provisional Patent Application Ser. No. 62/703,300, filed on Jul. 25, 2018, which is herein incorporated by reference in its entirety.

TECHNICAL FIELD

Embodiments of the present invention are related to networks and, in particular, to fast protection switching in distributed systems.

DISCUSSION OF RELATED ART

Distributed systems are increasingly being used in large scale computing systems, data storage, and other such systems. The standard requirement for such a network is that it remains operational in the event of a single failure. Such a failure can include events such as internal network element (NE) failures as well as media failures. NEs implement methods of protection against those failures. In a vast majority of cases, the NEs incorporate redundant hardware (HW) that can be switched to in the case the original hardware becomes inoperable. However, switching between redundant hardware elements after detection of a failure may take a significant amount of time.

Therefore, there is a need to develop systems that improve operation of distributed systems in the case of component failures.

SUMMARY

In accordance with some embodiments of the present invention, a system that switches between a clock signal from a first line card and a clock signal from a second line card based on information transmitted from the first line card and the second line card on timing signals. In some embodiments, a method of switching timing cards includes receiving a first pulse-width modulated clock signal from a first line card, the first pulse-width modulated clock signal including information regarding the status of the first line card; receiving a second pulse-width modulated clock signal from a second line card, the second pulse-width modulated clock signal including information regarding the status of the second line card; producing a clock signal from the first pulse-width modulated clock signal; and switching to producing the clock signal from the second pulse-width modulated clock signal based on the information in the first pulse-width modulated clock signal.

A timing card according to some embodiments includes a plurality of demodulators, each of the plurality of demodulators receiving a pulse-width modulated clock signal from a corresponding line card and recovering data encoded in the pulse-width modulation of the pulse-width modulated clock signal; a multiplexer coupled to the plurality of demodulators, the multiplexer receiving a clock signal from each of the plurality of demodulators, the clock signal corresponding to the received pulse-width modulated clock signal received at each demodulator; a controller coupled to the plurality of demodulators to receive the data encoded in each of the pulse-width modulated clock signal, and further coupled to the multiplexer to provide a signal selecting one of the clock signals; and a phase-locked loop that receives the selected one of the clock signals from the multiplexer and provides an output clock signal.

A line card according to some embodiments includes a phase-locked loop that receives a clock signal, the phase-locked loop providing a locked clock signal; a controller coupled to the phase-locked loop, the controller receiving a status indication from the phase-locked loop, the controller encoding the status indication to provide a data encoding; and a pulse-width modulation receiving the locked clock signal from the phase-locked loop and the data encoding from the controller, the pulse-width modulation determining duty times based on the data encoding.

A network system according to some embodiments includes a plurality of line cards, the plurality of line cards each providing a pulse-width modulated clock signal that includes encoded data; and a timing card that receives the pulse-width modulated clock signals from each of the plurality of line cards, the timing card providing a clock signal from the pulse-width modulated clock signal from a selected on the plurality of line cards, wherein the timing card can switch from a first line card of the plurality of line cards to a second line card of the plurality of line cards based on data encoded in the pulse-width modulated clock signals.

These and other embodiments are further discussed below with respect to the following figures.

DETAILED DESCRIPTION

Figure 1:
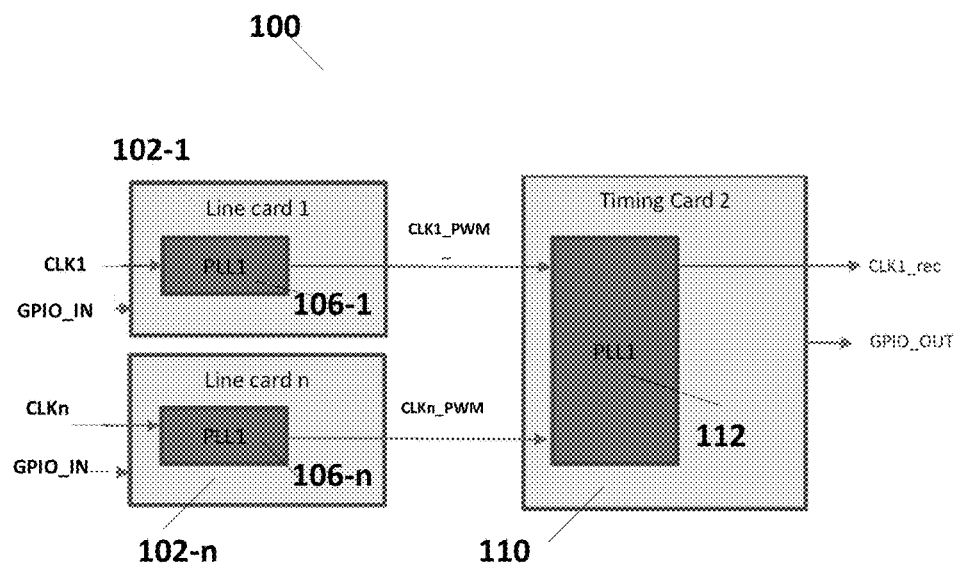
FIG. 1 illustrates a system according to some embodiments of the present invention.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Embodiments of the present invention includes a timing card that switches between a first clock signal from a first line card and a second clock signal from a second line card based on information transmitted from the first line card on the first clock signal and the second line card on the second clock signal. In some embodiments, the timing card receives a first pulse-width modulated clock signal from a first line card, the first pulse-width modulated clock signal including information regarding the status of the first line card. The timing card also receives a second pulse-width modulated clock signal from a second line card, the second pulse-width modulated clock signal including information regarding the status of the second line card. The timing card produces a clock signal from the first pulse-width modulated clock signal or switches to producing the clock signal from the second pulse-width modulated clock signal based on the information in the first pulse-width modulated clock signal.

As discussed above, the standard requirement for a network is to remain operational in the case of a single failure. Such failure can include such events as internal network element (NE) failures or a media failure. NEs implement methods of protection against those failures, which in the vast majority of cases incorporates redundant hardware (HW) that can be switched to in the case of the original hardware not being operational. However, detecting the failure and switching between redundant hardware elements can be a slow process.

Accurate timing is a crucial part of a reliable network operation. Therefore, carrier grade NEs always include protection for inaccuracies in the timing by providing secondary protection units. To get the best performance, the switchover between the currently running timing device, typically a phased-locked loop (PLL), and a secondary protection unit should happen with minimum delay. Currently that switching is achieved by either software (SW) reacting to an indication of a failure and sending control signals to the line and timing cards PLL of the NE, or the timing device (clock) is disabled by HW. For example, if a line is disconnected from the input of a NE, the loss of signal (LOS) indicator is sent to SW and the clock signal can be blocked from going to the timing card. This would allow the timing card PLL to disqualify the input quickly and switch to a new clock input.

In addition to frequency synchronization, the time synchronization becomes increasingly important. Timing accuracy also becomes increasingly important. To maintain extremely tight time alignment between line cards, a two-way time measurement is implemented, which dictates a constant running clock between timing and line cards. In addition to that, many line cards do not incorporate a processor. These two factors pose a problem for fast switching between a primary and a secondary clock source.

Embodiments of the present invention can use existing clock lines between timing cards and line cards to carry status information of the clock signal and provide for a timely switchover between clock signals. FIG. 1 illustrates a system 100 according to some embodiments with multiple line cards 102-1 through 102-n. There can be any number n of line cards 102 in system 100 where n≥2. In some embodiments, n=2. As is illustrated in FIG. 1, line card 102-1 includes a PLL circuit 106-1 coupled to receive a first clock signal CLK1. Line card 102-n includes a PLL circuit 106-n to receive another clock signal CLKn. Each of line cards 102-1 through 102-n further includes a GPIO input. PLL 106-1 through 106-n provide pulse-width modulated (PWM) clock signals CLK1_PWM through CLKn_PWM based on the clock signals CLK1 through CLKn, respectively.

As is illustrated in FIG. 1, the signals CLK1_PWM through CLKn_PWM are input to a PLL circuit 112 in timing card 110. PLL circuit 112 outputs a clock signal, labeled CLK1_rec in FIG. 1. Timing card 110 may also output a GPIO signal GPIO_OUT.

Embodiments of the present invention utilize PWM mechanism to carry information available on one card to another card via a clock line. This is illustrated in FIG. 1 as signals CLK1_PWM through CLKn_PWM. This information can include, for example, the PLL status of each of PLL circuits 106-1 through 106-n of line cards 102-1 through 102-n, respectively. The PLL information can be, for example, Loss of Signal (LOS), Loss of Lock (LOL), Loss of Clock (LOC), frequency offset status, any static status presented in GPIO or register, and other data. This allows one processor to control timing devices on processor-less line cards without additional control interfaces. The receiving card, in FIG. 1 timing card 110, decodes the information from the PWM data stream and performs functions in response to the received information. These functions performed by timing card 110 can include, for example, performing a switchover to a protection card (e.g., switching to using the clock signal CLK2 from line card 102-2 instead of signal CLK1 from line card 102-1), setting external signals, or updating a control register.

Figure 2:
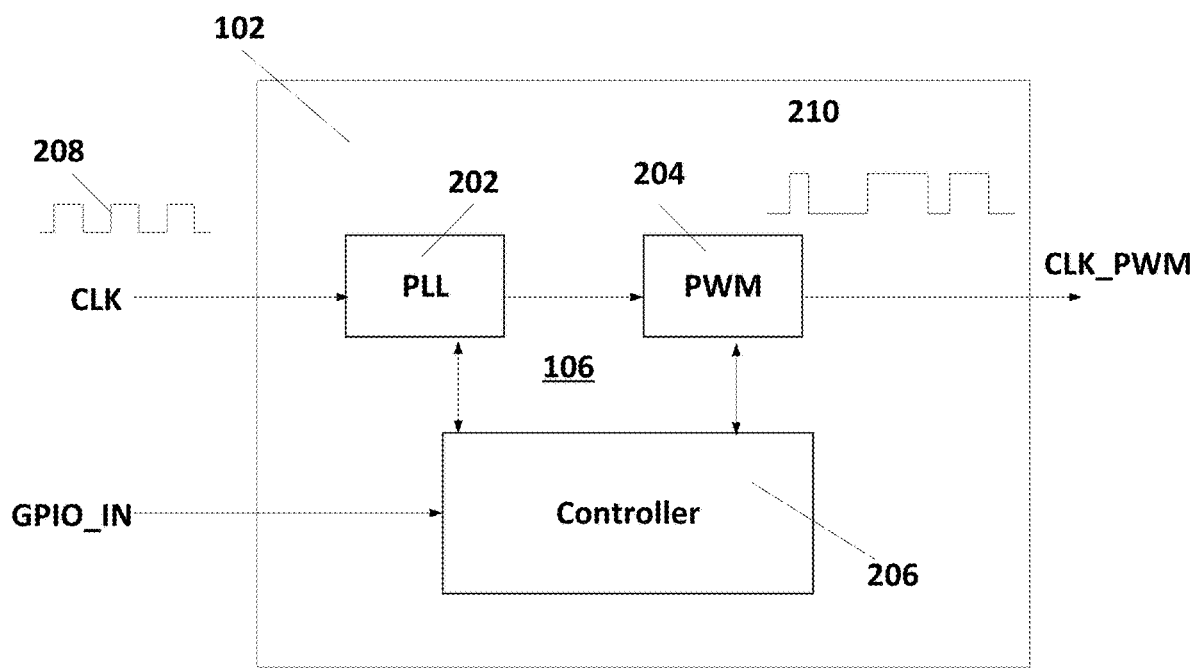
FIG. 2 illustrates a line card according to some embodiments of the present invention.

FIG. 2 illustrates an embodiment of a line card 102, which is one of line cards 102-1 through 102-n. As illustrated in FIG. 2, line card 102 receives a clock signal CLK and a General Purpose Input/Output (GPIO) signal GPIO_IN. The clock signal CLK is input to a phase-locked loop (PLL) 202. In some embodiments, the clock signal may operate at a frequency of tens of MHz. The phase-locked clock signal from PLL 202 is input to a pulse-width modulator (PWM) 204.

A controller 206 is coupled to both PLL 202 and PWM 204, which together make PLL circuit 106. Controller 206 also receives the GPIO signal GPIO_IN. Controller 206 can be any controlling device capable of performing the functions described herein. For example, controller 206 may include a processor (e.g. a microprocessor or microcomputer), sufficient memory (both nonvolatile and volatile) to allow for storage of data and programming instructions executed by the processor, and data input/output ports to communicate with internal components. In some embodiments, controller 206 may include interfaces to allow controller 206 to communicate with external computers or other network elements digitally and may further include a user interface to allow user to locally communicate with line card 102.

Controller 206 receives signals from PLL 202, which may indicate a LOS, LOL, LOC, frequency status as well as other status indicators as discussed above. Controller 206 further receives status indicators of further inputs transmitted as the GPIO data on GPIOIN. The GPIO status can trigger GPIO on another card which may control switchover mux, or send interrupt to CPU, or perform any other function defined by user.

Controller 206 then encodes this data to be transmitted on the output clock signal. As illustrated in FIG. 1, controller 206 is coupled with PWM 204. PWM 204 controls the duty cycle of the outgoing clock signal CLK_PWM while maintaining the clocking aspects (e.g., the rising edge of the clock signal). Data can be encoded in controller 206 and modulated into the duty cycle imposed on the phase-locked clock signal generated by PLL 202. For example, data bits can be transmitted as either a 25% duty cycle (e.g., "0") or a 75% duty cycle (e.g., "1"). Any number of duty cycle states can be generated such that symbols that contain multiple bits of data can be transmitted. FIG. 2 illustrates CLK input signal 208 and the pulse-width modulated output clock signal CLK_PWM 210 that includes data encoded into the duty-cycle characteristics of the clock signal. The status from one card to another can be transferred in microseconds which allows the receiving card to spend less time in either holdover or unknown state and as such can minimize the phase hit on the output of the clock. All this can be done without a dedicated control path.

Figure 3:
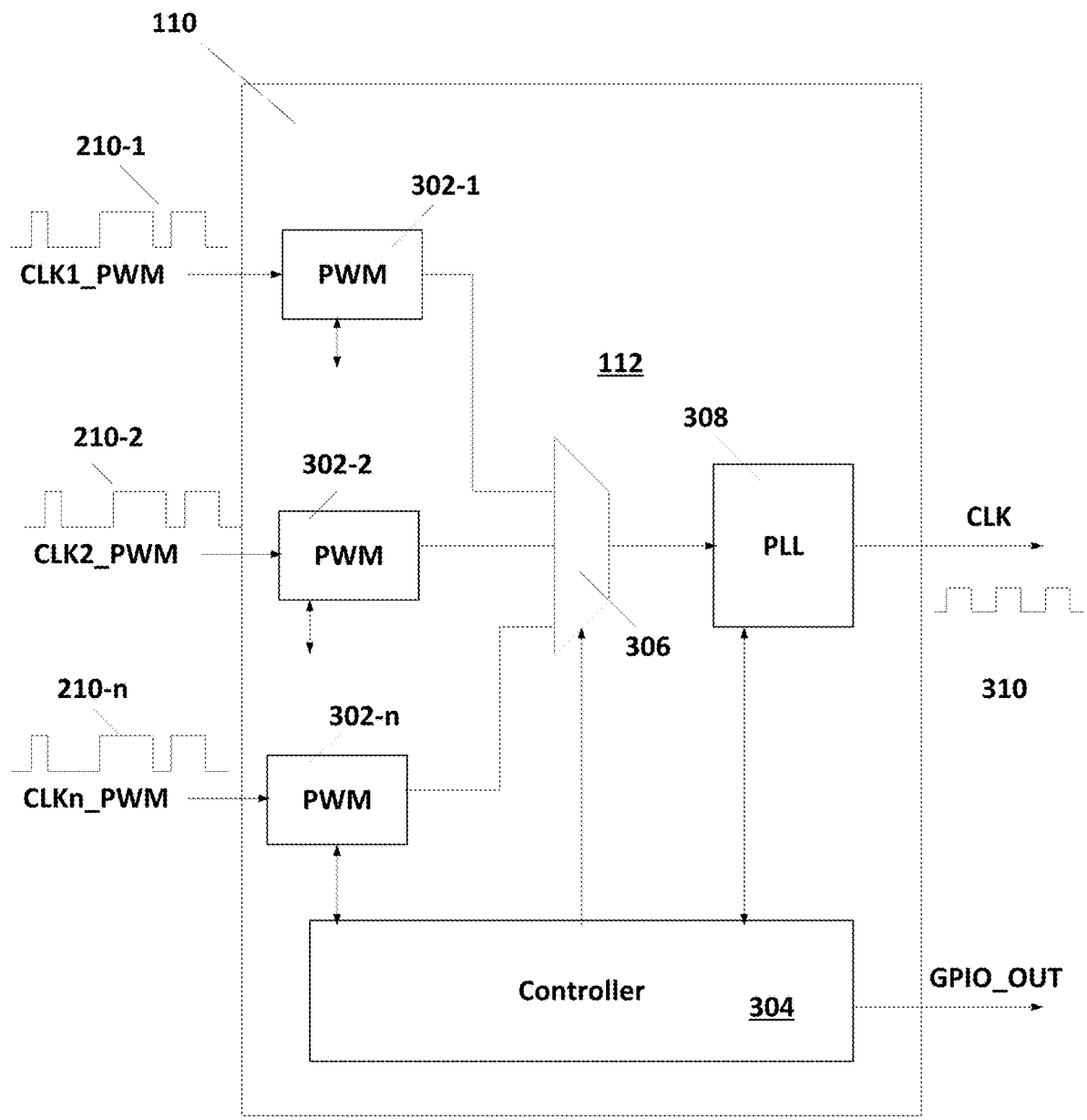
FIG. 3 illustrates a timing card according to some embodiments of the present invention.

FIG. 3 illustrates an embodiment of timing card 110 according to some embodiments of the present invention. As is illustrated in FIG. 2, timing card 110 receives modulated clock signals CLK1_PWM 210-1 through CLKn_PWM 210-n from each of line cards 102-1 through 102-n, respectively. Clock signals CLK1_PWM 210-1 through CLKn_PWM 210-n are received into PWM demodulators 302-1 through 302-n, respectively. PWM demodulators 302-1 through 302-n each recover the data encoded into clock signals CLK1_PWM 210-1 through CLKn_PWM 210-n, respectively, and provides that data to a controller 304.

Controller 304 can be any controlling device capable of performing the functions described herein. For example, controller 304 may include a processor (e.g. a microprocessor or microcomputer), sufficient memory (both nonvolatile and volatile) to allow for storage of data and programming instructions executed by the processor, and data input/output ports to communicate with internal components. In some embodiments, controller 304 may include interfaces to allow controller 304 to communicate with external computers or other network elements digitally and may further include a user interface to allow user to locally communicate with timing card 110.

Controller 304 retrieves the data encoded on each of clock signals CLK1_PWM 210-1 through CLKn_PWM 210-n from PWM demodulators 302-1 through 302-n, respectively. Demodulators 302-1 through 302-n further provides clock signals based on clock signals CLK1_PWM 210-1 through CLKn_PWM 210-n to a multiplexor 306. Controller 304 is further coupled to multiplexer 306 to switch between signals CLK1_PWM 210-1 through CLKn_PWM 210-n. Controller 304, therefore, can quickly switch from the clock signal from a first line card (e.g., line card 102-1) to a second line card (e.g., line card 102-2) if there is an error in the first line card, or an issue with the first line card is communicated to timing card 110 on the clock signal.

The line card from multiplexer 306 is then input to PLL 308. PLL 308 generates the output clock signal CLK 310 from timing card 110. Further, other information received on the incoming clock signals by controller 304 can be transmitted to other components in the network using the GPIO_OUT signal.

Consequently, information can be transmitted between line cards 102 and timing card 110 by PWM of the clock signal without the need for further interfacing lines. That data can be used to quickly switch between line cards 102 in the event of an error or anticipated error on the first line card. Further information regarding operation of network elements can also be transmitted between line cards 102 and timing card 110.

The above detailed description is provided to illustrate specific embodiments of the present invention and is not intended to be limiting. Numerous variations and modifications within the scope of the present invention are possible. The present invention is set forth in the following claims.

What is claimed is:

1. A method of switching timing cards, comprising:
   receiving a first pulse-width modulated clock signal from a first line card, the first pulse-width modulated clock signal including information regarding the status of the first line card;
   receiving a second pulse-width modulated clock signal from a second line card, the second pulse-width modulated clock signal including information regarding the status of the second line card;
   producing a clock signal from the first pulse-width modulated clock signal;
   switching to producing the clock signal from the second pulse-width modulated clock signal based on the information encoded in the first pulse-width modulated clock signal; and
   providing a GPIO output signal from data received on one or more of the first pulse-width modulated clock signal and the second pulse-width modulated clock signal.

2. The method of claim 1, wherein the information regarding the status of the first line card includes one or more of loss of signal, loss of connection, and frequency offset.

3. A timing card, comprising:
   a plurality of demodulators, each of the plurality of demodulators receiving a pulse-width modulated clock signal from a corresponding line card and recovering data encoded in the pulse-width modulation of the pulse-width modulated clock signal;
   a multiplexer coupled to the plurality of demodulators, the multiplexer receiving a clock signal from each of the plurality of demodulators, the clock signal corresponding to the received pulse-width modulated clock signal received at each demodulator;
   a controller coupled to the plurality of demodulators to receive the data encoded in each of the pulse-width modulated clock signal, and further coupled to the multiplexer to provide a signal selecting one of the clock signals;
   a phase-locked loop that receives the selected one of the clock signals from the multiplexer and provides an output clock signal; and
   an output GPIO signal based on the data received from the plurality of demodulators.

4. The timing card of claim 3, wherein the controller controls the multiplexer to switch between clock signals received from the plurality of demodulators based on data received from the plurality of demodulators.

5. A line card, comprising:
   a phase-locked loop that receives a clock signal, the phase-locked loop providing a locked clock signal;
   a controller coupled to the phase-locked loop, the controller receiving a status indication from the phase-locked loop, the controller encoding the status indication to provide a data encoding; and
   a pulse-width modulator receiving the locked clock signal from the phase-locked loop and the data encoding from the controller, the pulse-width modulation determining duty times based on the data encoding,
   wherein the controller further receives GPIO data and the data encoding further includes the GPIO data.

6. A network system, comprising:
   a plurality of line cards, the plurality of line cards each providing a pulse-width modulated clock signal that includes encoded data; and
   a timing card that receives the pulse-width modulated clock signals from each of the plurality of line cards, the timing card providing a clock signal from the pulse-width modulated clock signal from a selected one of the plurality of line cards,
wherein the timing card can switch from a first line card of the plurality of line cards to a second line card of the plurality of line cards based on data encoded in the pulse-width modulated clock signals,
wherein the timing card provides GPIO data from the data encoded in the pulse-width modulated clock signals.

* * * * *